(12) United States Patent
Wan

(10) Patent No.: US 10,468,891 B2
(45) Date of Patent: Nov. 5, 2019

(54) CHARGER FOR VACUUM CLEANER AND FAST CHARGING CONTROLLING METHOD THEREOF

(71) Applicants: JIANGSU MIDEA CLEANING APPLIANCES CO., LTD., Suzhou (CN); MIDEA GROUP CO., LTD., Foshan (CN)

(72) Inventor: Dekang Wan, Suzhou (CN)

(*) Notice: Subject to any disclaimer, the term of this patent is extended or adjusted under 35 U.S.C. 154(b) by 37 days.

(21) Appl. No.: 15/905,845

(22) Filed: Feb. 27, 2018

(65) Prior Publication Data

US 2019/0020202 A1  Jan. 17, 2019

(30) Foreign Application Priority Data

Jul. 17, 2017  (CN) .......................... 2017 1 0582148
Jul. 21, 2017  (CN) .......................... 2017 1 0598933
(Continued)

(51) Int. Cl.
H02J 7/00  (2006.01)
H02J 7/02  (2016.01)
(Continued)

(52) U.S. Cl.
CPC .......... *H02J 7/0013* (2013.01); *A47L 9/2873* (2013.01); *A47L 9/2884* (2013.01);
(Continued)

(58) Field of Classification Search
CPC ..... Y02E 60/12; H01M 2/1055; H01M 10/46; H01M 10/425; H02J 7/0045
See application file for complete search history.

(56) References Cited

U.S. PATENT DOCUMENTS 6,018,227 A * 1/2000 Kumar .............. H01M 10/4257
                                              320/106
6,076,226 A * 6/2000 Reed ........................ A47L 5/28
                                              15/319
(Continued)

FOREIGN PATENT DOCUMENTS

CN  201490278 U  5/2010
CN  102428620 A  4/2012
(Continued)

OTHER PUBLICATIONS

CN First Office Action dated Feb. 3, 2019 in the corresponding CN application (application No. 201110582148.4).
(Continued)

*Primary Examiner* — Arun C Williams
(74) *Attorney, Agent, or Firm* — Kilpatrick Townsend & Stockton, LLP

(57) ABSTRACT

A charger for a vacuum cleaner and a fast charging controlling method thereof are provided. The charger includes: a plurality of first charging interfaces; a rectifying device configured to rectify an alternating current to output a direct current; a plurality of charging controlling devices each connected between an output end of the rectifying device and a first charging interface correspondingly; and a main controlling device configured to communicate with each of the first charging interfaces respectively to identify whether any first charging interface is connected with a device to be charged acquire a parameter of the device to be charged if identifying that a first charging interface is connected with the device to be charged, and perform charging control on the device to be charged through a charging controlling device corresponding to the first charging interface according to the parameter of the device to be charged.

20 Claims, 7 Drawing Sheets

(30) Foreign Application Priority Data

Jul. 21, 2017 (CN) .......................... 2017 1 0598935
Jul. 21, 2017 (CN) ..................... 2017 2 0889124 U

(51) Int. Cl.
*H02J 7/04* (2006.01)
*H01M 10/44* (2006.01)
*A47L 9/28* (2006.01)

(52) U.S. Cl.
CPC ....... *H01M 10/443* (2013.01); *H01M 10/446* (2013.01); *H02J 7/022* (2013.01); *H02J 7/04* (2013.01)

(56) References Cited

U.S. PATENT DOCUMENTS

| | | | | |
|---|---|---|---|---|
| 8,410,751 | B2* | 4/2013 | Terao | ...................... H01F 38/14 320/108 |
| 2003/0182758 | A1 | 10/2003 | Hisano et al. | |
| 2010/0060232 | A1* | 3/2010 | Boyles | .................. H02J 7/0027 320/107 |
| 2010/0093401 | A1* | 4/2010 | Moran | .................. G06F 1/1626 455/566 |
| 2011/0193523 | A1* | 8/2011 | Law | ...................... H02J 7/0042 320/113 |
| 2013/0335900 | A1 | 12/2013 | Jang | |
| 2014/0361740 | A1* | 12/2014 | Suzuki | .................. H02J 7/0027 320/108 |
| 2016/0072317 | A1 | 3/2016 | Guz et al. | |
| 2017/0133881 | A1* | 5/2017 | Cho | ........................ H02J 50/10 |
| 2017/0179736 | A1* | 6/2017 | Kim | ...................... H02J 7/0019 |

FOREIGN PATENT DOCUMENTS

| | | |
|---|---|---|
| CN | 103825335 A | 5/2014 |
| CN | 104836306 A | 8/2015 |
| CN | 105207288 A | 12/2015 |
| CN | 205194753 U | 4/2016 |
| CN | 105932740 A | 9/2016 |
| EP | 2149958 A2 | 2/2010 |
| EP | 2448036 A1 | 5/2012 |
| JP | H07250788 A | 10/1995 |
| JP | 3658545 B2 | 10/2002 |
| JP | 2002291670 A | 10/2002 |

OTHER PUBLICATIONS

CN First Office Action dated Mar. 5, 2019 in the corresponding CN application (application No. 201710598933.9).
European Office Action dated Mar. 16, 2018 in the corresponding European application(application No. 18156044.2).
The first Office Action dated May 22, 2019 in the corresponding CN application No. 201710598935.8.

* cited by examiner

CHARGER FOR VACUUM CLEANER AND FAST CHARGING CONTROLLING METHOD THEREOF

FIELD

The present disclosure relates to the field of vacuum cleaners, and more particularly to a charger for a vacuum cleaner and a fast charging controlling method for the charger for the vacuum cleaner.

BACKGROUND

With continuous technological advances and breakthroughs in vacuum cleaner industry, newer and better vacuum cleaners go gradually into thousands of households, in which a hand-held cordless rechargeable vacuum cleaner is one of the best. However, user's requirements on the rechargeable vacuum cleaner are also increasing, and short charging time and long working hours become important conditions for people to choose the rechargeable vacuum cleaner.

At present, there are two charging schemes for the vacuum cleaner, in scheme I, the whole machine is charged by a wall-type adapter or by the wall-type adapter through a hanger on the wall, this scheme can only charge a single battery pack after the vacuum cleaner stops working, and thus charging the vacuum cleaner and using the vacuum cleaner cannot be in parallel; in scheme II, the battery pack is detachable, and may be placed on the charger for charging, a scene in which one battery pack is charged and another battery pack is used may be realized if two battery packs are configured. It may be seen that the related charging schemes can only realize charging for one battery pack, thus affecting user experience.

SUMMARY

Embodiments of the present disclosure seek to solve at least one of the problems existing in the related art to at least some extent. Therefore, embodiments provide a charger for a vacuum cleaner. The charger can charge both the vacuum cleaner and the battery pack, thus saving user time and improving user experience.

Further embodiments provide a fast charging controlling method for a charger for a vacuum cleaner.

An embodiment of a first aspect of the present disclosure provides a charger for a vacuum cleaner, including: a plurality of first charging interfaces including at least a main charging interface corresponding to the vacuum cleaner and a battery charging interface corresponding to a battery pack; a rectifying device having an input end connected with an alternating current power supply, and configured to receive an alternating current output by the alternating current power supply and rectify the alternating current to output a direct current; a plurality of charging controlling devices each connected between an output end of the rectifying device and a first charging interface correspondingly; and a main controlling device configured to communicate with each of the first charging interfaces respectively to identify whether any first charging interface is connected with a device to be charged, acquire a parameter of the device to be charged if identifying that a first charging interface is connected with the device to be charged, and perform charging control on the device to be charged through a charging controlling device corresponding to the first charging interface according to the parameter of the device to be charged, in which the device to be charged includes the battery pack to be charged and/or the vacuum cleaner to be charged.

With the charger for the vacuum cleaner according to embodiments of the present disclosure, several devices to be charged can be connected to the charger by providing with a plurality of first charging interfaces, and after the charger for the vacuum cleaner is powered on, whether any first charging interface is connected with a device to be charged is identified by the main controlling device, a parameter of the device to be charged is acquired if identifying that a first charging interface is connected with the device to be charged, and charging control on the device to be charged is performed through a charging controlling device corresponding to the first charging interface according to the parameter of the device to be charged. Thus, charging requirements of different types of devices to be charged, such as the vacuum cleaner and the battery pack can be realized, thereby improving user experience.

In an embodiment of the present disclosure, whether a parameter of the battery pack to be charged is normal is judged by the main controlling device when identifying that only the battery pack to be charged is connected with a first charging interface, and charging control on the battery pack to be charged is performed through a charging controlling device corresponding to the first charging interface if the parameter of the battery pack to be charged is normal; whether a parameter of the battery pack in the vacuum cleaner to be charged is normal is judged by the main controlling device when identifying that only the vacuum cleaner to be charged is connected with a first charging interface, and charging control on the vacuum cleaner to be charged is performed through a charging controlling device corresponding to the first charging interface if the parameter of the battery pack in the vacuum cleaner to be charged is normal; and charging control on the vacuum cleaner to be charged is performed preferentially by the main controlling device when identifying that the battery pack to be charged and the vacuum cleaner to be charged each are connected with a first charging interface respectively, and then charging control on the battery pack to be charged is performed by the main controlling device after charging of the vacuum cleaner to be charged is completed.

In an embodiment of the present disclosure, the parameter of the device to be charged includes a temperature and a voltage of the battery pack to be charged if the device to be charged is the battery pack to be charged; and the parameter of the device to be charged includes a temperature and a voltage of the battery pack in the vacuum cleaner to be charged if the device to be charged is the vacuum cleaner to be charged.

In an embodiment of the present disclosure, the above charger for the vacuum cleaner further includes: at least one second charging interface including at least one of a USB charging interface, a TYPE-C charging interface, or a 12VDC charging interface; and at least one voltage conversion device connected with the output end of the rectifying device, and configured to perform a boost conversion or a buck conversion on the direct current output by the rectifying device and apply a direct current converted to the at least one second charging interface.

In an embodiment of the present disclosure, the main controlling device includes: a first acquiring device configured to acquire the voltage of the battery pack; a judging device configured to judge whether the voltage of the battery pack is greater than or equal to a first preset voltage; a second acquiring device configured to acquire the temperature of the battery pack when the voltage of the battery pack is greater than or equal to the first preset voltage; and a controlling sub-device configured to perform charging control on the battery pack according to the temperature of the battery pack.

Further, the controlling sub-device is specifically configured to: judge the temperature of the battery pack; charge the battery pack with a first charging current in a constant current mode when the temperature of the battery pack is greater than a first preset temperature and less than a second preset temperature; charge the battery pack with a second charging current in a constant current mode when the temperature of the battery pack is less than or equal to the first preset temperature and greater than or equal to a third preset temperature or when the temperature of the battery pack is greater than or equal to the second preset temperature and less than or equal to a fourth preset temperature, in which the second charging current is less than the first charging current; and not charge the battery pack when the temperature of the battery pack is less than the third preset temperature or when the temperature of the battery pack is greater than the fourth preset temperature.

In an embodiment of the present disclosure, the charger for the vacuum cleaner as described above further includes: a prompting device; in which the controlling sub-device is further configured to recondition the battery pack with a pre-charging current when the voltage of the battery pack is less than the first preset voltage, and to stop charging the battery pack and control the prompting device to transmit an error-reporting message if the voltage of the battery pack is still less than the first preset voltage after the battery pack is reconditioned for a preset time, in which the pre-charging current is less than the first charging current.

In an embodiment of the present disclosure, the judging device is further configured to judge whether the battery pack is in a failed state according to the voltage of the battery pack before judging whether the voltage of the battery pack is greater than or equal to the first preset voltage, and the controlling sub-device is configured to stop charging the battery pack and control the prompting device to transmit the error-reporting message, if the battery pack is in the failed state.

In an embodiment of the present disclosure, the controlling sub-device is further configured to: charge the battery pack with a first charging voltage in a constant voltage mode, if the voltage of the battery pack reaches the first charging voltage after the battery pack is charged with the first charging current in the constant current mode; charge the battery pack with a second charging current in a constant current mode when the charging current of the battery pack drops to the second charging current; charge the battery pack with a second charging voltage in a constant voltage mode if the voltage of the battery pack reaches the second charging voltage after the battery pack is charged with the second charging current in the constant current mode; determine completion of the charging for the battery pack until the charging current of the battery pack drops to a third charging current, in which the second charging voltage is less than the first charging voltage and the third charging current is less than the second charging current.

In an embodiment of the present disclosure, the above charger for the vacuum cleaner further includes: a plurality of turn-off controlling devices each connected between an output end of a charging controlling device and a first charging interface correspondingly, in which a corresponding turn-off controlling device is controlled by the controlling sub-device to stop charging the battery pack.

In an embodiment of the present disclosure, the above charger for the vacuum cleaner further includes: a plurality of charging voltage detecting devices, each disposed between a turn-off controlling device and a first charging interface correspondingly, connected with the controlling sub-device, and configured to detect a charging voltage of the first charging interface, in which the turn-off controlling device is controlled by the controlling sub-device to stop charging the battery pack when the charging voltage of the first charging interface is abnormal; and/or a plurality of charging current detecting devices, each disposed between a turn-off controlling device and a first charging interface correspondingly, connected with the controlling sub-device, and configured to detect a charging current of the first charging interface, in which the turn-off controlling device is controlled by the controlling sub-device to stop charging the battery pack when the charging current of the first charging interface is abnormal.

In an embodiment of the present disclosure, the battery pack includes: a housing; a battery located within the housing; and a heat dissipating component configured to dissipate heat of the battery and located within the housing.

In an embodiment of the present disclosure, two opposite side walls of the housing are a first side wall and a second side wall, the first side wall has a first through-hole, the second side wall has a second through-hole opposite to the first through-hole, both of the battery and the heat dissipating component are located between the first side wall and the second side wall.

In an embodiment of the present disclosure, the heat dissipating component includes at least one of a wind wheel, a heat dissipating fin, a heat dissipating silicone layer, a semiconductor heat dissipating element, or a phase changing material, when the heat dissipating component is the heat dissipating fin, a first end of the heat dissipating fin is connected with the battery, and a second end of the heat dissipating fin extends toward the housing, and has a plurality of grooves spaced apart from each other; and when the heat dissipating component is the heat dissipating silicone layer, the heat dissipating silicone layer is wrapped at a periphery of the battery.

In an embodiment of the present disclosure, the battery pack is located within an air duct of the vacuum cleaner.

An embodiment of a second aspect of the present disclosure provides a fast charging controlling method for a charger for a vacuum cleaner, in which the charger includes a plurality of first charging interfaces, a rectifying device, a plurality of charging controlling devices, and a main controlling device, in which the plurality of first charging interface includes at least a main charging interface corresponding to the vacuum cleaner and a battery charging interface corresponding to a battery pack, an input end of the rectifying device is connected with an alternating current power supply, the rectifying device is configured to receive an alternating current output by the alternating current power supply and rectify the alternating current to output a direct current, each of the plurality of charging controlling devices is connected between an output end of the rectifying device and a first charging interface correspondingly, and the main controlling device is configured to communicate with each of the first charging interfaces respectively, the method includes: identifying whether any first charging interface is connected with a device to be charged, after the charger is powered on; acquiring a parameter of the device to be charged if identifying that a first charging interface is connected with the device to be charged; and performing charging control on the device to be charged through a charging controlling device corresponding to the first charging interface according to the parameter of the device to be charged, in which the device to be charged includes the battery pack to be charged and/or the vacuum cleaner to be charged.

With the fast charging controlling method for a charger for a vacuum cleaner according to an embodiment of the present disclosure, after the charger for the vacuum cleaner is powered on, whether any first charging interface is connected with a device to be charged is identified, a parameter of the device to be charged is acquired if identifying that a first charging interface is connected with the device to be charged, and charging control on the device to be charged is performed through a charging controlling device corresponding to the first charging interface according to the parameter of the device to be charged. Thus, charging requirements of different types of devices to be charged, such as the vacuum cleaner and the battery pack can be realized, thereby improving user experience.

In an embodiment of the present disclosure, performing charging control on the device to be charged through a charging controlling device corresponding to the first charging interface according to the parameter of the device to be charged includes: judging whether a parameter of the battery pack to be charged is normal when identifying that only the battery pack to be charged is connected with a first charging interface, and performing charging control on the battery pack to be charged through a charging controlling device corresponding to the first charging interface when the parameter of the battery pack to be charged is normal; judging by the main controlling device whether a parameter of the battery pack in the vacuum cleaner to be charged is normal when identifying that only the vacuum cleaner to be charged is connected with a first charging interface, and performing charging control on the vacuum cleaner to be charged through a charging controlling device corresponding to the first charging interface when the parameter of the battery pack in the vacuum cleaner to be charged is normal; and performing charging control on the vacuum cleaner to be charged through the main controlling device preferentially when identifying that the battery pack to be charged and the vacuum cleaner to be charged each are connected with a first charging interface, and then performing charging control on the battery pack to be charged through the main controlling device after charging of the vacuum cleaner to be charged is completed.

In an embodiment of the present disclosure, the parameter of the device to be charged includes a temperature and a voltage of the battery pack to be charged when the device to be charged is the battery pack to be charged; and the parameter of the device to be charged includes a temperature and a voltage of the battery pack in the vacuum cleaner to be charged when the device to be charged is the vacuum cleaner to be charged.

In an embodiment of the present disclosure, performing charging control on the device to be charged through a charging controlling device corresponding to the first charging interface according to the parameter of the device to be charged includes: acquiring the voltage of the battery pack; judging whether the voltage of the battery pack is greater than or equal to a first preset voltage; acquiring the temperature of the battery pack when the voltage of the battery pack is greater than or equal to the first preset voltage; and performing charging control on the battery pack according to the temperature of the battery pack.

Further, performing charging control on the battery pack according to the temperature of the battery pack includes: judging the temperature of the battery pack; charging the battery pack with a first charging current in a constant current mode if the temperature of the battery pack is greater than a first preset temperature and less than a second preset temperature; charging the battery pack with a second charging current in a constant current mode if the temperature of the battery pack is less than or equal to the first preset temperature and greater than or equal to a third preset temperature or if the temperature of the battery pack is greater than or equal to the second preset temperature and less than or equal to a fourth preset temperature, in which the second charging current is less than the first charging current; and not charging the battery pack if the temperature of the battery pack is less than the third preset temperature or if the temperature of the battery pack is greater than the fourth preset temperature.

In an embodiment of the present disclosure, the battery pack is reconditioned with a pre-charging current when the voltage of the battery pack is less than the first preset voltage, and the charging of the battery pack is stopped and the vacuum cleaner is controlled to transmit an error-reporting message if the voltage of the battery pack is still less than the first preset voltage after the battery pack is reconditioned for a preset time, in which the pre-charging current is less than the first charging current.

In an embodiment of the present disclosure, whether the battery pack is in a failed state is judged according to the voltage of the battery pack before judging whether the voltage of the battery pack is greater than or equal to the first preset voltage, and the charging of the battery pack is stopped and the vacuum cleaner is controlled to transmit the error-reporting message, if the battery pack is in the failed state.

In an embodiment of the present disclosure, the battery pack is charged with a first charging voltage in a constant voltage mode if the voltage of the battery pack reaches the first charging voltage after the battery pack is charged with the first charging current in the constant current mode; the battery pack is charged with a second charging current in a constant current mode when the charging current of the battery pack drops to the second charging current; the battery pack is charged with a second charging voltage in a constant voltage mode if the voltage of the battery pack reaches the second charging voltage after the battery pack is charged with the second charging current in the constant current mode; completion of the charging for the battery pack is determined until the charging current of the battery pack drops to a third charging current, in which the second charging voltage is less than the first charging voltage and the third charging current is less than the second charging current.

An embodiment of a third aspect of the present disclosure provides a vacuum cleaner, including a DC motor, a battery pack and a charger, and the charger includes: a plurality of first charging interfaces including at least a main charging interface corresponding to the vacuum cleaner and a battery charging interface corresponding to the battery pack; a rectifying device having an input end connected with an alternating current power supply, and configured to receive an alternating current output by the alternating current power supply and rectify the alternating current to output a direct current; a plurality of charging controlling devices each connected between an output end of the rectifying device and a first charging interface correspondingly; and a main controlling device configured to communicate with each of the first charging interfaces respectively to identify whether any first charging interface is connected with the battery pack, acquire a parameter of the battery pack to be charged if identifying that a first charging interface is connected with the battery pack to be charged, and perform charging control on the battery pack to be charged through a charging controlling device corresponding to the first charging interface according to the parameter of the battery pack to be charged.

Additional aspects and embodiments of the present disclosure will be set forth in part in the following description, part of which will be apparent from the following description, or learning from practice of the present disclosure.

DETAILED DESCRIPTION

Figure 1:
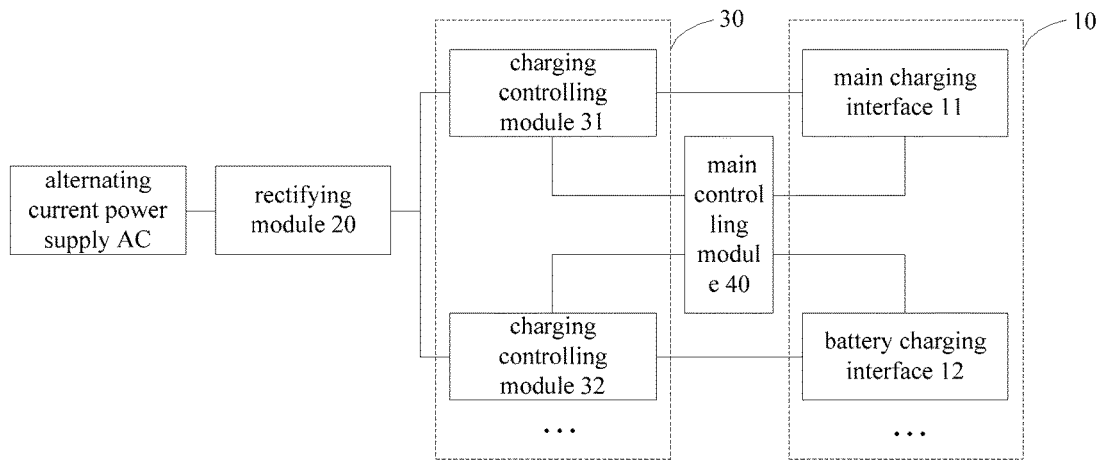
FIG. 1 is a block diagram of a charger for a vacuum cleaner according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Hereinafter, a charger for a vacuum cleaner and a fast charging controlling method thereof according to embodiments of the present disclosure will be described with reference to the accompanying drawings.

FIG. 1 is a block diagram of a charger for a vacuum cleaner according to an embodiment of the present disclosure. As shown in FIG. 1, the charger for the vacuum cleaner includes a plurality of first charging interfaces 10, a rectifying device 20, a plurality of charging controlling devices 30, and a main controlling device 40.

Referring to FIG. 1, the plurality of first charging interfaces 10 include at least a main charging interface 11 corresponding to the vacuum cleaner and a battery charging interface 12 corresponding to the battery pack. The rectifying device 20 has an input end connected with an alternating current power supply AC and is configured to receive an alternating current output by the alternating current power supply AC and rectify the alternating current to output a direct current. In one embodiment, the rectifying device 20 may include a rectifying circuit (such as a full-bridge rectifying circuit, a half-bridge rectifying circuit, etc.), a voltage regulating circuit (such as a boost circuit, a LC circuit, etc.) so as to convert the alternating current into the stable direct current. Each of the plurality of charging controlling devices 30 is connected between an output end of the rectifying device 20 and a first charging interface correspondingly. The main controlling device 40 communicates with each of the first charging interfaces respectively to identify whether any first charging interface is connected with a device to be charged, acquire a parameter of the device to be charged if identifying that a first charging interface is connected with the device to be charged, and perform charging control on the device to be charged through a charging controlling device corresponding to the first charging interface according to the parameter of the device to be charged.

In an embodiment of the present disclosure, the device to be charged includes the battery pack to be charged and/or the vacuum cleaner to be charged. It may be understood that, when referring to charging the vacuum cleaner, it means to charge the battery pack in the vacuum cleaner, and the battery pack is detachable relative to the battery pack. Therefore, a user may choose to directly charge the vacuum cleaner or charge the detached battery pack.

Alternatively, a battery box for placing the battery pack may be provided. The battery box may be fixed on the charger or disposed detachably relative to the charger, for example, the battery box is buckled on the charger through a snap or connected with the charger through a connecting line, and so on. It may be understood that, one end of the connecting line may be inserted into the battery charging interface 12 when the battery box is connected with the charger through the connecting line.

In one embodiment, after the charger is connected to the alternating current power supply AC, the rectifying device 20 receives and rectifies the alternating current output by the alternating current power supply AC to output the direct current. When a plug of the vacuum cleaner is inserted into the main charging interface 11 and the battery pack is placed into the battery box and connected to the battery charging interface 12, the main controlling device 40 communicates with the main charging interface 11 to identify that the main charging interface 11 is connected with a device to be charged and communicates with the battery charging interface 12 to identify that the battery charging interface 12 is connected with a device to be charged. In such a case, the main controlling device 40 may select to preferentially charge the device to be charged corresponding to the main charging interface 11, i.e., to obtain parameters of the battery pack in the vacuum cleaner (such as a temperature and a voltage of the battery pack), and charging control on the vacuum cleaner can be performed by the charging controlling device 31 corresponding to the main charging interface 11 according to the parameters of the battery pack in the vacuum cleaner.

Further, after charging for the vacuum cleaner is completed by the charger, the charging for the vacuum cleaner may be stopped by the main controlling device 40 and charging for the battery pack in the battery box is to be started, that is, to obtain parameters of the battery pack in the battery box, such as the temperature and the voltage of the battery pack, and charging control on the battery pack can be performed by the charging controlling device 32 corresponding to the battery charging interface 12 according to the parameters of the battery pack in the battery box.

Therefore, with the charger for the vacuum cleaner, not only charging requirement of the vacuum cleaner can be realized, but also the detached battery pack can be charged, thereby saving waiting time and operating time of the user and improving user experience.

It should be noted that, in any charging time period, the main controlling device 40 performs charging control only on one device to be charged corresponding to the first charging interface.

In one embodiment, when identifying that only the battery pack to be charged is connected with a first charging interface (i.e., the battery charging interface 12), the main controlling device 40 judges whether a parameter of the battery pack to be charged is normal, and performs charging control on the battery pack to be charged through a charging controlling device 32 corresponding to the battery charging interface 12 if the parameter of the battery pack to be charged is normal; when identifying that only the vacuum cleaner to be charged is connected with the first charging interface (i.e., the main charging interface 11), the main controlling device 40 judges whether a parameter of the battery pack in the vacuum cleaner to be charged is normal, and performs charging control on the vacuum cleaner to be charged through a charging controlling device 31 corresponding to the main charging interface 11 if the parameter of the battery pack in the vacuum cleaner to be charged is normal; when identifying that the battery pack to be charged is connected with the battery charging interface 12 and the vacuum cleaner to be charged is connected with the main charging interface 11, and the main controlling device 40 performs charging control on the vacuum cleaner to be charged preferentially, and then performs charging control on the battery pack to be charged after charging of the vacuum cleaner to be charged is completed.

Therefore, with the charger for the vacuum cleaner, not only charging requirement of the vacuum cleaner can be realized, but also the detached battery pack can be charged, thereby saving waiting time and operating time of the user and improving user experience.

Figure 2:
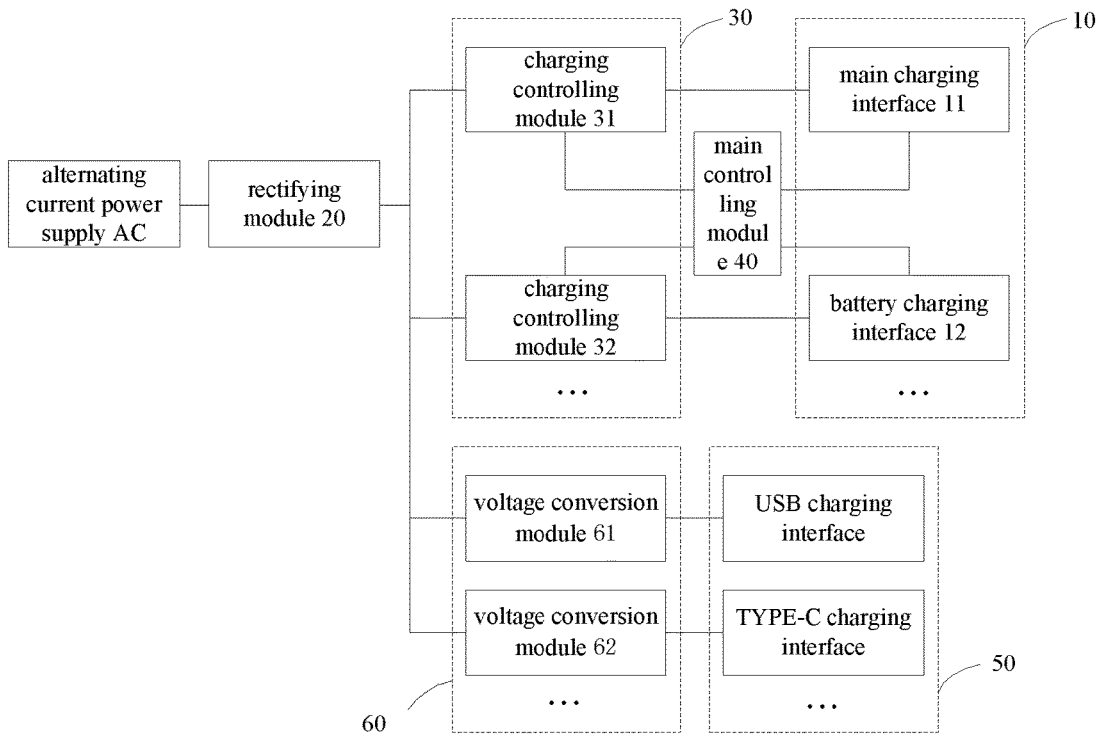
FIG. 2 is a block diagram of a charger for a vacuum cleaner according to a second embodiment of the present disclosure.

In another embodiment of the present disclosure, as shown in FIG. 2, the charger for the vacuum cleaner may further include at least one second charging interface 50, and the second charging interface 50 includes at least one of a USB charging interface, a TYPE-C charging interface, or a 12VDC charging interface. Thus, the charging requirements of different types of devices to be charged can be realized by the charger for the vacuum cleaner.

Further, as shown in FIG. 2, the charger for the vacuum cleaner may further include at least one voltage conversion device 60 connected with the output end of the rectifying device 20, and configured to perform a boost conversion or a buck conversion on the direct current output by the rectifying device 20 and apply a direct current converted to the at least one second charging interface 50.

For example, referring to FIG. 2, the second charging interface 50 includes a USB charging interface. A USB plug of a data cable corresponding to a mobile phone can be inserted into the USB charging interface when the mobile phone may need to be charged. After the charger is connected to the alternating current power supply, the rectifying device 20 receives rectifies a 220 V alternating current output by the alternating current power supply AC to output a 220 V direct current. The direct current output by the rectifying device 20 is applied to the USB charging interface after a voltage reduction conversion (e.g., being reduced to 5V) by the voltage conversion device corresponding to the USB charging interface in order to charge the mobile phone.

It should be noted that, when the first charging interface 10 and the second charging interface 50 each are connected with a device to be charged, the device to be charged connected to the first charging interface 10 may be charged preferentially, or the devices to be charged connected to the first charging interface 10 and the second charging interface 50 may be charged simultaneously. When both the vacuum cleaner to be charged and the battery pack to be charged are connected to the charger, the vacuum cleaner to be charged is charged preferentially, and the battery pack to be charged is charged after charging for the vacuum cleaner to be charged is completed. When a plurality of devices to be charged are connected to the second charging interfaces 50, the plurality of devices to be charged may be charged simultaneously.

Therefore, a plurality of devices to be charged can be connected to the charger by providing with the plurality of first charging interfaces and the at least one second charging interface. The device to be charged can be identified by the main controlling device such that charging control on the device to be charged is performed by the corresponding charging controlling device when it is identified that the device to be charged is connected to the charger. Thus, charging requirements of different types of devices to be charged, such as the vacuum cleaner and the battery pack can be realized, thereby improving user experience.

Figure 3:
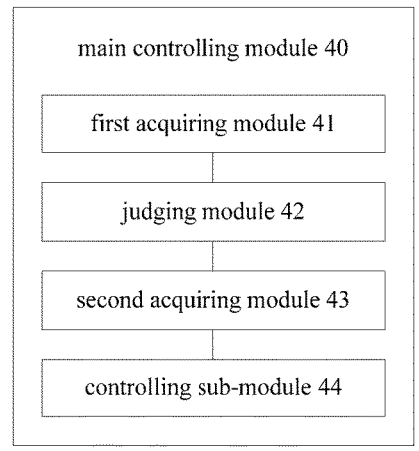
FIG. 3 is a block diagram of a main controlling device according to an embodiment of the present disclosure.

Further, according to an embodiment of the present disclosure, as shown in FIG. 3, the main controlling device 40 includes: a first acquiring device 41, a judging device 42, a second acquiring device 43 and a controlling sub-device 44. The first acquiring device 41 is configured to acquire the voltage of the battery pack (the battery pack described herein refers to a battery pack to be charged when the battery pack to be charged is charged; or a battery pack in a vacuum cleaner to be charged when the vacuum cleaner to be charged is charged). The judging device 42 is configured to judge whether the voltage of the battery pack is greater than or equal to a first preset voltage. The second acquiring device 43 is configured to acquire the temperature of the battery pack when the voltage of the battery pack is greater than or equal to the first preset voltage. The controlling sub-device 44 is configured to perform charging control on the battery pack according to the temperature of the battery pack. The first preset voltage is set as an over-discharged voltage limit of the battery pack. When the voltage of the battery pack is greater than the first preset voltage, it indicates that the battery pack is not over-discharged, and fast charging with a large current can be applied.

Further, the controlling sub-device 44 is specifically configured to: judge the temperature of the battery pack; charge the battery pack with a first charging current in a constant current mode when the temperature of the battery pack is greater than a first preset temperature and less than a second preset temperature; charge the battery pack with a second charging current in a constant current mode when the temperature of the battery pack is less than or equal to the first preset temperature and greater than or equal to a third preset temperature or when the temperature of the battery pack is greater than or equal to the second preset temperature and less than or equal to a fourth preset temperature, in which the second charging current is less than the first charging current; and not charge the battery pack when the temperature of the battery pack is less than the third preset temperature or greater than the fourth preset temperature.

In one embodiment, when the battery pack to be charged or the battery pack in the vacuum cleaner to be charged are charged, the voltage of the battery pack is acquired by the first acquiring device 41, and whether the voltage of the battery pack is greater than or equal to the first preset voltage is judged by the judging device 42, and the temperature of the battery pack is acquired by the second acquiring device 43 if the voltage of the battery pack is greater than or equal to the first preset voltage, and then whether the charger enters into a fast charging mode is determined by the controlling sub-device 44 according to the temperature of the battery pack.

Figure 4:
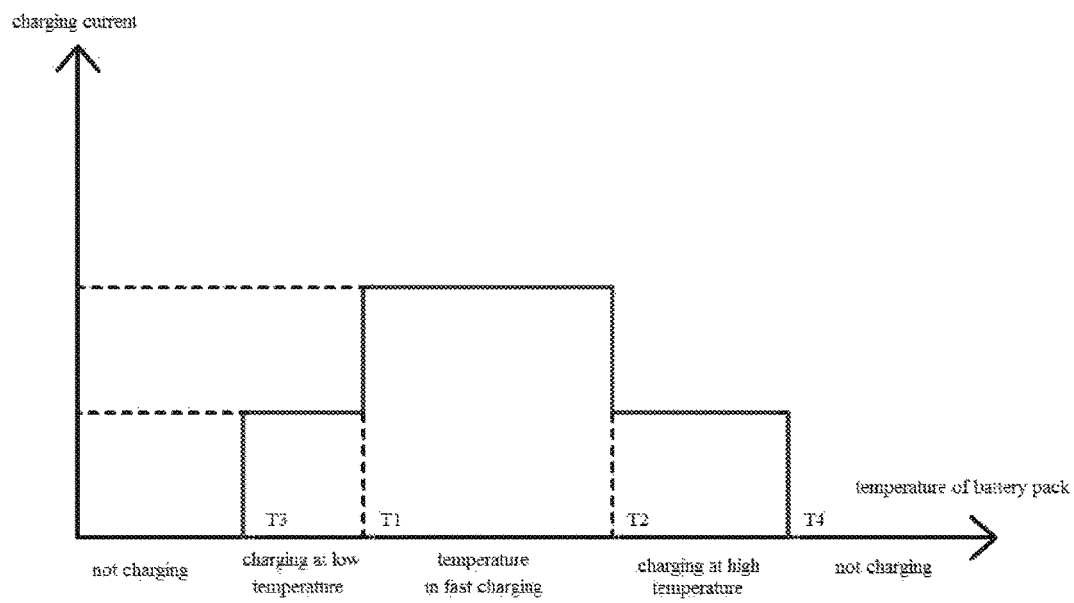
FIG. 4 is a graph of a relationship between a charging current and a temperature of a battery pack according to an embodiment of the present disclosure.

Referring to FIG. 4, if the temperature of the battery pack is greater than the first preset temperature T1 and less than the second preset temperature T2, i.e., within an interval (T1, T2), the charger enters into the fast charging mode, i.e., charges the battery pack with a first charging current I1 in a constant current mode; if the temperature of the battery pack is less than or equal to the first preset temperature T1 and greater than or equal to the third preset temperature T3 or when the temperature of the battery pack is greater than or equal to the second preset temperature T2 and less than or equal to the fourth preset temperature T4, the charger does not apply the fast charging mode and chooses a general charging mode, i.e., charges the battery pack with a second charging current I2 in a constant current mode; if the temperature of the battery pack is not within an allowed charging temperature range, that is, the temperature of the battery pack is less than the third preset temperature T3 or higher than the fourth preset temperature T4, the battery pack is not charged until the temperature is reverted and the charging mode is re-judged. Therefore, the stability for charging the battery pack can be improved, and fast charging the battery pack at a suitable temperature is realized. In some embodiments, a relationship between the second charging current I2 and the first charging current I1 may be that the I2 value is within an interval [I1/3, 3*I1/5].

Figure 5:
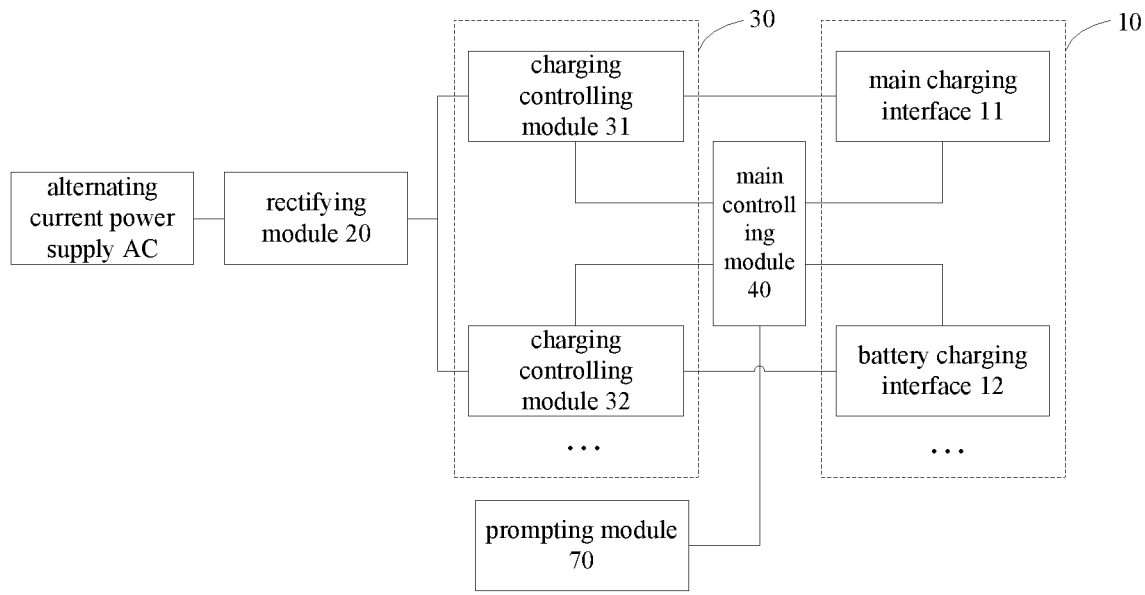
FIG. 5 is a block diagram of a charger for a vacuum cleaner according to a third embodiment of the present disclosure.

According to an embodiment of the present disclosure, as shown in FIG. 5, the charger for the vacuum cleaner as described hereinbefore further includes a prompting device 70. The controlling sub-device 44 is further configured to recondition the battery pack with a pre-charging current when the voltage of the battery pack is less than the first preset voltage, and to stop charging the battery pack and control the prompting device 70 to transmit an error-reporting message if the voltage of the battery pack is still less than the first preset voltage after the battery pack is reconditioned for a preset time. The pre-charging current is less than the first charging current.

In one embodiment, when the voltage of the battery pack is less than the first predetermined voltage such as 12 V, the battery pack is reconditioned by the controlling sub-device 44 with the pre-charging current, such as 1/10 of the first charging current. When the voltage of the battery pack rises to 12 V within the preset time such as 30 minutes, the temperature of the battery pack is acquired by the second acquiring device 43, and the charging of the battery pack is controlled by the controlling sub-device 44 according to the temperature of the battery pack. However, if the voltage of the battery pack is still less than the first preset voltage (such as 12V) after the battery pack is reconditioned with the pre-charging current for the preset time such as 30 minutes, the controlling sub-device 44 stops charging the battery pack and controls the prompting device 70 to transmit the error-reporting message. Alternatively, the prompting device 70 may be a buzzer, and the error-reporting message transmitted from the prompting device 70 may be a sound like "beep" for example transmitted from the buzzer, so as to remind the user to replace or repair the battery pack.

In an embodiment of the present disclosure, in order to ensure safety and effectiveness for charging the battery pack, the judging device 42 is further configured to judge whether the battery pack is in a failed state according to the voltage of the battery pack before judging whether the voltage of the battery pack is greater than or equal to the first preset voltage, and the controlling sub-device 44 stops charging the battery pack and controls the prompting device 70 to transmit the error-reporting message, if the battery pack is in the failed state.

In one embodiment, when the voltage of the battery pack is detected to be 0, it is determined that a battery cell in the battery pack is short-circuited and the battery pack is in the failed state. In such a case, charging for the battery pack is stopped, and the prompting device 70 is controlled to emit a sound like "beep" so as to remind the user to replace or repair the battery pack.

Further, according to an embodiment of the present disclosure, the controlling sub-device 44 is further configured to: charge the battery pack with a first charging voltage in a constant voltage if the voltage of the battery pack reaches the first charging voltage after the battery pack is charged with the first charging current in the constant current mode; charge the battery pack with a second charging current in a constant current mode when the charging current of the battery pack drops to the second charging current; charge the battery pack with a second charging voltage in a constant voltage mode if the voltage of the battery pack reaches the second charging voltage after the battery pack is charged with the second charging current in the constant current mode; determine completion of the charging for the battery pack until the charging current of the battery pack drops to a third charging current. The second charging voltage is less than the first charging voltage, and the third charging current is less than the second charging current. Alternatively, the third charging current I3 may be 1/10 to 1/5 of the first charging current I1, for example, I3=I1/10.

Figure 6:
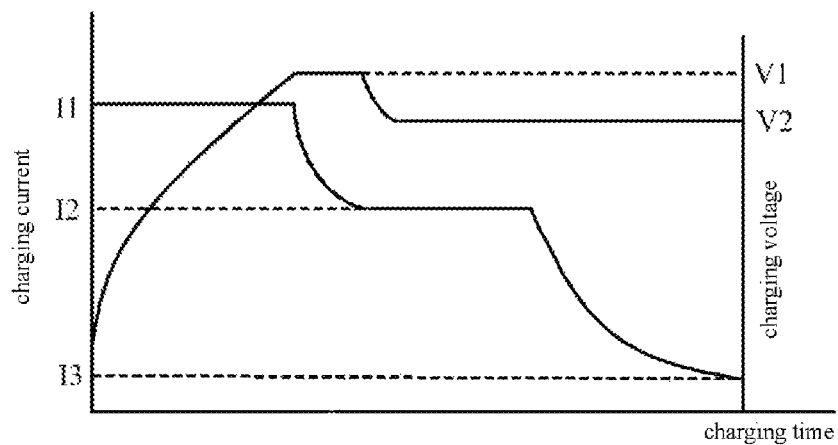
FIG. 6 is a graph of a relationship among a charging current, a charging voltage and a charging time according to an embodiment of the present disclosure.

In one embodiment, referring to FIG. 6, the battery pack is charged with the first charging voltage V1 in the constant voltage mode, if the voltage of the battery pack reaches the first charging voltage V1 after the controlling sub-device 44 uses the first charging current I1 to charge the battery pack in the constant current mode. Then, the charging current drops, and the battery pack is charged with the second charging current I2 in the constant current mode when the charging current of the battery pack drops to the second charging current I2. The battery pack is charged with the second charging voltage I2 in the constant voltage mode if the voltage of the battery pack reaches the second charging voltage V2 after the battery pack is charged with the second charging current I2 in the constant current mode. Completion of the charging for the battery pack is determined until the charging current of the battery pack drops to the third charging current I3.

It should be noted that, in embodiments of the present disclosure, charging control in CC+CV mode is not limited to two phases, i.e., I1+V1 and I2+V2, and may include for example three phases or four phases.

The fast charging mode according to embodiments of the present disclosure will be described with reference to examples and FIG. 7.

Figure 7:
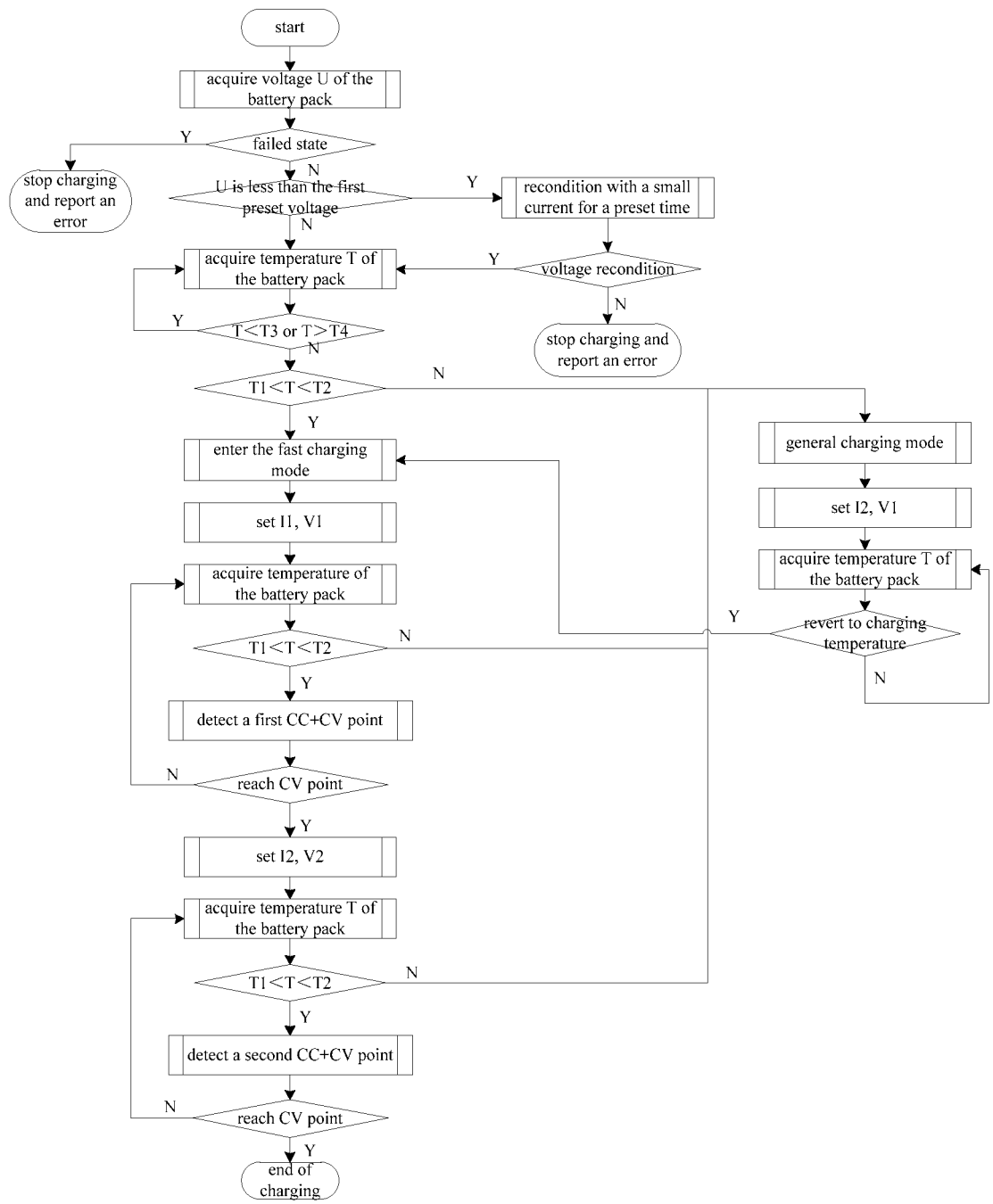
FIG. 7 is a flow chart showing fast charging of a battery pack according to an embodiment of the present disclosure.

As shown in FIG. 7, when a battery pack (the battery pack to be charged or the battery pack in the vacuum cleaner to be charged) is connected to the charger, the first acquiring device 41 acquires the voltage of the battery pack, and the judging device 42 judges whether the battery pack is in a failed state according to the voltage of the battery pack. The controlling sub-device 44 stops charging the battery pack and the error-reporting message is reported by the prompting device 70 if the battery pack is in the failed state. The battery pack is reconditioned by the controlling sub-device 44 with a preset charging current if the battery pack is not in the failed state and the voltage of the battery pack is less than the first preset voltage. The controlling sub-device 44 stops charging battery pack and the error-reporting message is reported by the prompting device 70 if the controlling sub-device 44 fails to recondition the battery pack within the preset time. The temperature T of the battery pack is acquired by the second acquiring device 43 if the battery pack is not in the failed state and the voltage of the battery pack is greater than or equal to the first preset voltage or the controlling sub-device 44 succeeds to recondition the battery pack within the preset time.

Further, referring to FIGS. 3 and 5, if T1<T<T2, the fast charging mode is entered, that is, the controlling sub-device 44 applies the first charging current I1 to charge the battery pack in the constant current mode. When the voltage of the battery pack reaches the first charging voltage V1, i.e., when the voltage of the battery pack reaches a point of CC (constant current)+CV (constant voltage) for the first time, the battery pack is charged by the controlling sub-device 44 with V1 in the constant voltage mode, during which, the charging current I drops, when the I drops to I2, the battery pack is charged with I2 in the constant current mode. When the voltage of the battery pack reaches the second charging voltage V2, that is, when the voltage of the battery pack reaches the point of CC+CV for the second time, the battery pack is charged by the controlling sub-device 44 with V2 in the constant voltage mode, and it is determined that charging for the battery pack is completed until the charging current I of the battery pack drops to the third charging current I3.

A general charging mode is entered if the temperature T of the battery pack meets T3≤T≤T1 or T2≤T≤T4, that is, the battery pack is charged by the controlling sub-device 44 with I2 in a constant current mode. In this process, the fast charging mode as described above is entered if T1<T<T2.

A waiting mode is entered if the temperature T of the battery pack meets T<T3 or T>T4, and the controlling sub-device 44 enters a corresponding charging mode according to the temperature T until the temperature of the battery pack meets T3≤T≤T4.

It should be noted that, after entering the fast charging mode, the controlling sub-device 44 enters the corresponding charging mode according to T if the temperature T of the battery pack does not meet T1<T<T2.

Therefore, with the above charging process, the fast charging of the battery pack can be ensured, the charging time is shortened, good safety and high reliability can be achieved during the charging process, thereby improving use convenience of the vacuum cleaner and improving user experience.

Figure 8:
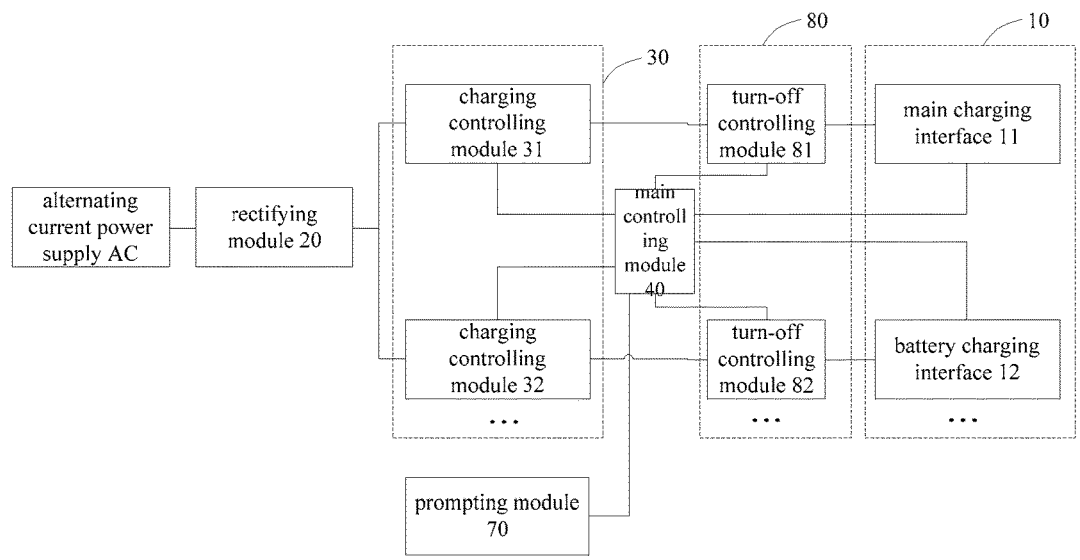
FIG. 8 is a block diagram of a charger for a vacuum cleaner according to a fourth embodiment of the present disclosure.

Further, according to an embodiment of the present disclosure, as shown in FIG. 8, the above charger for the vacuum cleaner further includes a plurality of turn-off controlling devices 80 each connected between an output end of a charging controlling device and a first charging interface correspondingly, and a corresponding turn-off controlling device is controlled by the controlling sub-device 44 to stop charging the battery pack.

In one embodiment, in the process of charging the battery pack, the battery pack is reconditioned by the controlling sub-device 44 with the pre-charging current if the voltage of the battery pack is less than the first preset voltage, and the controlling sub-device 44 may control a turn-off controlling device (such as a relay) corresponding to the battery pack to stop charging the battery pack and control the prompting device 70 to transmit an error-reporting message if the voltage of the battery pack is still less than the first preset voltage after the battery pack is reconditioned for the preset time; if the battery pack is in the failed state, the controlling sub-device 44 may control a turn-off controlling device corresponding to the battery pack to stop charging the battery pack and control the prompting device 70 to transmit an error-reporting message. Therefore, a safety problem caused by continue charging the battery pack in a case that the battery pack has been damaged can be prevented effectively, and charging safety and whole device safety can be effectively improved. If charging for the battery pack is completed, the controlling sub-device 44 controls the turn-off controlling device corresponding to the battery pack to stop charging the battery pack, thereby effectively preventing problems of reduced service life of the battery pack and increased power consumption caused by continue to charge the battery pack in such a case that the battery pack is fully charged.

Further, the above charger for the vacuum cleaner further includes a communicating device (not shown in figures), the communicating device is respectively connected with the first acquiring device 41 and the second acquiring device 43, the first acquiring device 41 is configured to acquire the voltage of the battery pack through the communicating device, and the second acquiring device 43 is configured to acquire the temperature of the battery pack through the communicating device.

In addition, in the charging process, other state information of battery pack, such as a voltage of a battery cell in the battery pack or a voltage difference between battery cells, etc., can also be received by the communicating device and then transmitted by the communicating device to the controlling sub-device 44, and the controlling sub-device 44 judges whether the battery pack is abnormal according to the state information in the charging process, e.g., when the temperature of the battery pack is greater than a safety temperature threshold or a temperature rising rate is greater than a certain value, it is determined that the battery pack is abnormal. When determining that the battery pack is abnormal, the controlling sub-device 44 immediately controls the turn-off controlling device to stop charging the battery pack, thereby effectively preventing safety problems caused by continue charging the battery pack in a case that the battery pack has been damaged and effectively improving charging safety and whole device safety.

In an embodiment of the present disclosure, the communicating device may include one or more of a CAN communicating device, an RS232 communicating device, or an RS485 communicating device.

In one embodiment, in theory, the communicating device may be a wired communicating device or a wireless communicating device. However, as the rotational speed of the vacuum cleaner is high, which may have a negative influence on wireless signals, the wired communicating device is in embodiments of the present disclosure. Moreover, the anti-interference capability of the CAN communicating device is stronger as compared with that of the RS232 communicating device and the RS485 communicating device, so it is further preferably to use the CAN communicating device to receive the state information in the charging process of the battery pack.

Further, according to an embodiment of the present disclosure, the communicating device communicates with a battery manager of the battery pack to receive the state information in charging process of the battery pack.

In one embodiment, each battery pack is usually configured with a battery manager to manage the state information of the battery pack when the battery pack is charged or discharged. For example, when the battery pack is charged, the battery manager may monitor each single battery in the battery pack in real time to acquire the voltage of the single battery, the voltage and charge quantity of the entire battery pack, moreover, a surface temperature of the battery pack is acquired by a temperature detecting device (such as a temperature sensing bulb) disposed on the battery pack. Then, the battery manager transmits the detected state information of the battery pack to the communicating device.

In order to realize data transmission, the battery manager is further connected with a second communicating device which matches the communicating device in the charger. The state information of the battery pack is transmitted by the battery manager through a signal output end of the second communicating device, and is received by a signal receiving end of the communicating device, and then is forwarded to the main controlling device 40.

According to another embodiment of the present disclosure, the communicating device communicates with a main controlling board (such as an MCU) of the vacuum cleaner to receive the state information in charging process of the battery pack.

In one embodiment, when the vacuum cleaner to be charged is charged, the main controlling board of the vacuum cleaner may communicate with the battery manager to receive the state information of the battery pack, or directly detect the state information of the battery pack through the corresponding detecting device. For example, the surface temperature of the battery pack is acquired by a battery temperature detecting device (such as a temperature sensing bulb) disposed on the battery pack, and the voltage of each single battery in the battery pack, the voltage and charge quantity of the entire battery pack are detected by a battery voltage detecting device. Then, the detected state information of the battery pack is transmitted to the communicating device by the main controlling board of the vacuum cleaner through e.g., a signal output end of the third communicating device, and is received by the signal receiving end of the communicating device, and then is forwarded to the main controlling device 40.

Further, in embodiments of the present disclosure, abnormality detections on the charging voltage and the charging current output by the charging controlling device may also be performed in the charging process of the battery pack.

Figure 9:
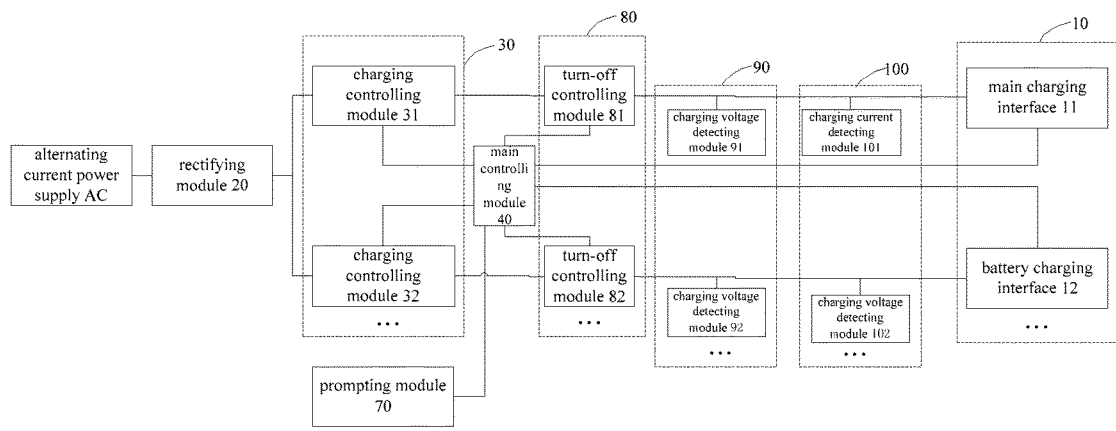
FIG. 9 is a block diagram of a charger for a vacuum cleaner according to a fifth embodiment of the present disclosure.

According to an embodiment of the present disclosure, as shown in FIG. 9, the charger for the vacuum cleaner as described above further includes a plurality of charging voltage detecting devices 90, each disposed between a turn-off controlling device and a first charging interface correspondingly, connected with the controlling sub-device 44, and configured to detect a charging voltage of the first charging interface. The turn-off controlling device 44 is controlled by the controlling sub-device 44 to stop charging the battery pack when the charging voltage of the first charging interface is abnormal.

In other words, a charging voltage detecting device, such as a detecting circuit composed of a divider resistor, is disposed in a charging circuit between the turn-off controlling device and the first charging interface to detect the voltage value output by the charging controlling device in real time in charging process. If the voltage value exceeds a safety threshold, the controlling sub-device 44 determines that an overvoltage condition happens at current, and controls the turn-off controlling device to stop charging the battery pack, thus preventing the battery pack from being overvoltage charged.

Further, as shown in FIG. 9, the above charger for the vacuum cleaner further includes: a plurality of charging current detecting devices 100, each disposed between a turn-off controlling device and a first charging interface correspondingly, connected with the controlling sub-device 44, and configured to detect a charging current of the first charging interface. The turn-off controlling device is controlled by the controlling sub-device 44 to stop charging the battery pack when the charging current of the first charging interface is abnormal.

In other words, a charging current detecting device, such as a detecting circuit composed of a sampling resistor, is disposed in a charging circuit of the battery pack to detect a current value output by the charging controlling device in the charging process in real time. If the current value exceeds a safety threshold, the controlling sub-device 44 determines that an over-current state happens at current, and controls the turn-off controlling device to stop charging the battery pack, thus preventing the battery pack from being charged under the over-current condition.

Therefore, when the battery pack is fully charged or abnormal condition happens during charging the battery pack, the turn-off controlling device can be controlled to stop charging the battery pack timely, thus not only improving the safety of the charger, but also reducing energy consumption and saving energy.

In addition, in fast charging mode, a large charging current I1 and a large charging power are used, much heat is generated by the charger and the battery pack, which result in a high temperature rise, and affect charging reliability and safety in the charging process, therefore, it is necessary to perform heat dissipation on the entire charging system including the charger and the battery pack to ensure reliability and safety of the fast charging. However, consumer's requirements on the efficiency and working time of rechargeable charging vacuum cleaners are also increasing, while battery packs usually require strict temperature control and may stop discharging above a certain temperature. Increasing energy density and high efficient dust collecting requirements are in contradiction with heat generation of the battery pack. In the related art, the battery pack is mainly based on natural heat dissipation which has poor heat dissipation effect and low heat dissipation efficiency, and may not meet performance requirements of the vacuum cleaner. Therefore, how to ensure continuous charging and discharging of the battery pack with a large current becomes a bottleneck in the field of the vacuum cleaner.

According to an embodiment of the present disclosure, as shown in FIG. 10 to FIG. 13, the battery pack 200 may include a housing 210, a battery 220 located within the housing 210 and a heat dissipating component 230 configured to dissipate heat of the battery 220 and located within the housing 210. It may be understood that the housing 210 defines an inner chamber 240 therein, the battery 220 and the heat dissipating component 230 may be located in the inner chamber 240. When the battery 220 supplies power to the vacuum cleaner or the battery 220 is charged, the temperature of the battery 220 may increase and heat is generated, the heat dissipating component 230 can dissipate heat in the inner chamber 240 and cools the inner chamber 240 to allow the battery 220 to work within a proper temperature range and play the maximum performance, thereby further increasing the service life of the battery 220, increasing working time and working efficiency of the vacuum cleaner, as well as ensuring reliability and safety of fast charging. Moreover, fast heat dissipation can also reduce time waiting for charging after the battery 220 is used.

It should be noted that the housing 210 is not limited to a shape, which may be in a cuboid shape, a cube shape, or a cylinder shape. Further, the battery 220 may be a lithium-ion battery which is a rechargeable battery and works mainly relying on movements of lithium ions between positive and negative electrodes. The lithium-ion battery has an increasing higher energy density, a large capacity, and long-lasting discharging, and thus can improve the working hours greatly if applied in the field of vacuum cleaners. Moreover, the lithium-ion battery has a small volume and thus may occupy a small space, which may be beneficial to miniaturization and artistic design of the vacuum cleaner.

Figure 10:
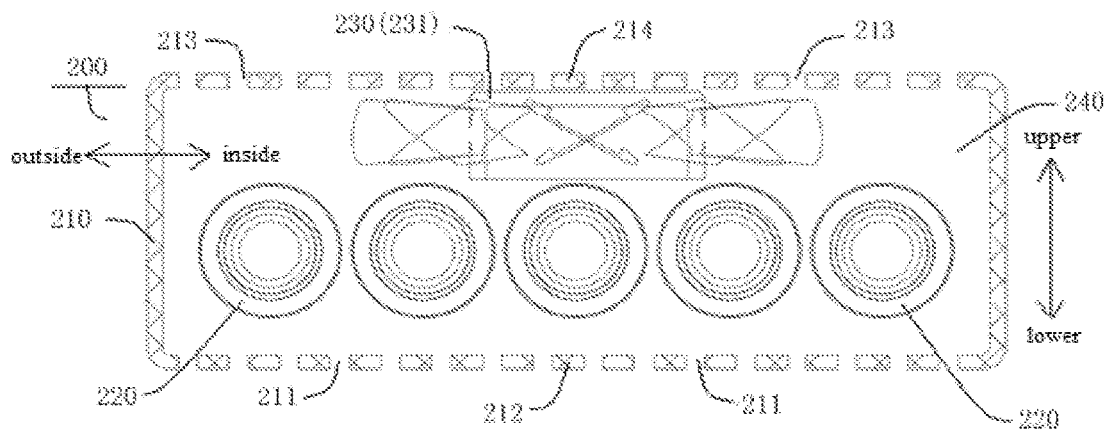
FIG. 10 is a sectional schematic view of a battery pack according to a first embodiment of the present disclosure.
Figure 11:
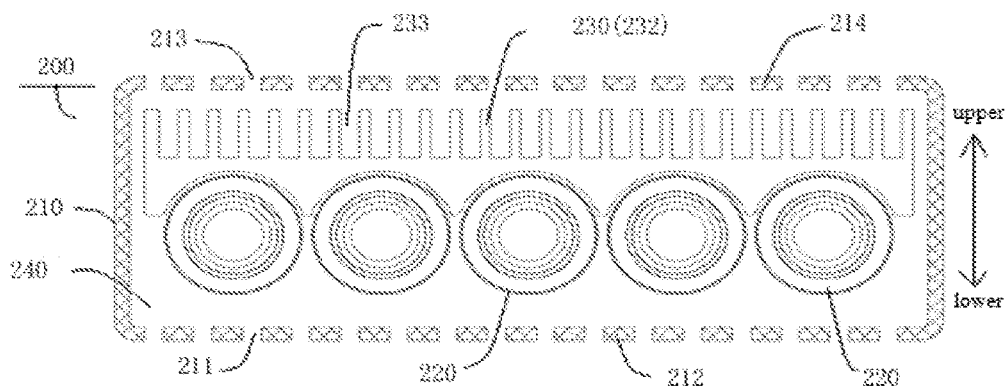
FIG. 11 is a sectional schematic view of a battery pack according to a second embodiment of the present disclosure.
Figure 13:
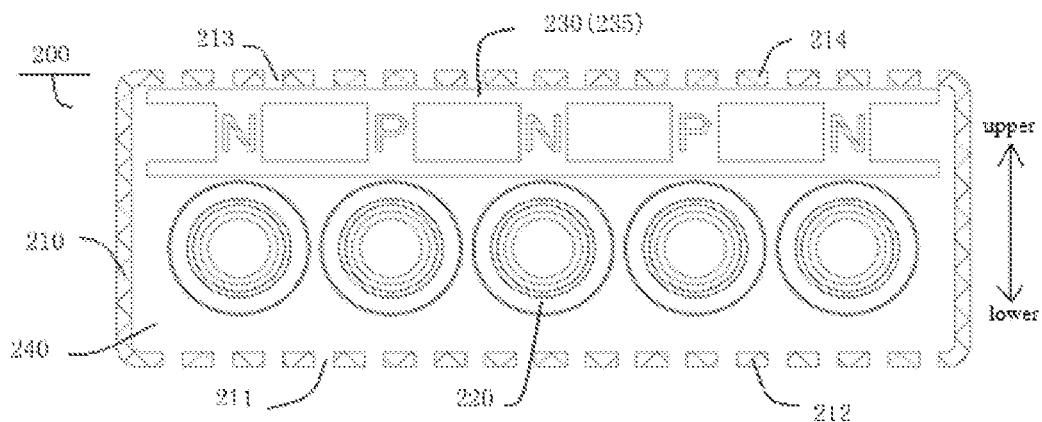
FIG. 13 is a sectional schematic view of a battery pack according to a fourth embodiment of the present disclosure.

According to some embodiments of the present disclosure, as shown in FIGS. 10-11 and 13, two opposite side walls of the housing 210 are a first side wall 212 and a second side wall 214, the first side wall 212 has a first through-hole 211, the second side wall 214 has a second through-hole 213 opposite to the first through-hole 211, both of the battery 220 and the heat dissipating component 230 are located between the first side wall 212 and the second side wall 214.

It may be understood that the housing 210 has two opposite side walls which are the first side wall 212 and the second side wall 214 respectively. Both of the battery 220 and the heat dissipating component 230 may be located between the first side wall 212 and the second side wall 214. The first through-hole 211 may be disposed in the first side wall 212 to communicate the inner chamber 240 of the housing 210 with the outside. The second through-hole 213 may be disposed in the second side wall 214 to communicate the inner chamber 240 of the housing 210 with the outside. The first through-hole 211 and the second through-hole 213 are disposed opposite to each other.

For example, in some embodiments of the present disclosure, as shown in FIGS. 10-11 and 13, the housing 210 has a rectangular section, the battery 220 and the heat dissipating member 230 are located between an upper side and a lower side of the rectangle (as shown in FIGS. 10-11 and 13), and rectangular through-holes are disposed at the right opposite positions of the upper side and the lower side.

Thereby, air in the inner chamber 240 can communicate with the outside air through the first through-hole 211 and the second through-hole 213, so as to increase heat exchanging efficiency between the air in the inner chamber 240 and the outside air, thereby further facilitating the heat dissipation and cooling of the battery pack 200. It should be illustrated that the "outside" mentioned herein refers to the outside of the housing 210 relative to the inner chamber 240 (as shown in FIG. 10), which may refer to outside space and may also refer to other structural space inside the vacuum cleaner, such as air duct.

As shown in FIGS. 10-11 and 13, in some embodiments of the present disclosure, the battery 220 and the heat dissipating component 230 are disposed side by side in a direction from the first side wall 212 to the second side wall 214. For example, in an embodiment of the present disclosure, as shown in FIGS. 10-11 and 13, in the direction from the first side wall 212 to the second side wall 214, i.e., a direction from upper to lower as shown in FIGS. 10-11 and 13, the heat dissipating component 230 is located right above the battery 220. That is, the heat dissipating component 230 is adjacent to the second side wall 214, and the battery 220 is adjacent to the first side wall 212. As a result, the action range and the action effect of the heat dissipating component 230 on the battery 220 can be improved, thus lowering the temperature of the battery pack 200.

Further, in a direction from the first through-hole 211 to the second through-hole 213, the battery 220 and the heat dissipating component 230 are disposed side by side. Further, centers of the first through-hole 211, the second through-hole 213, the battery 220 and the heat dissipating member 230 are collinear. Thereby, the heat dissipating effect can be improved.

As shown in FIGS. 10-11 and 13, in some embodiments of the present disclosure, there are a plurality of first through-holes 211 and a plurality of second through-holes 213, and the plurality of first through-holes 211 and the plurality of second through-holes 213 are in one to one correspondence. It may be understood that the first side wall 212 has a plurality of first through-holes 211, and the second side wall 214 has a plurality of second through-holes 213 opposite to the plurality of first through-holes 211. Thus, the plurality of first through-holes 211 and the plurality of second through-holes 213 both can communicate the inner chamber 240 of the housing 210 with the outside of the housing 210, so as to improve the heat exchange rate of the air. Further, the plurality of first through-holes 211 are evenly distributed in the first side wall 212. As a result, the heat exchange between air in different regions within the inner chamber 240 and air outside the housing 210 can be balanced, so that an over high local temperature in the inner chamber 240 can be avoided.

In embodiments of the present disclosure, the heat dissipating component 230 includes at least one of a wind wheel, a heat dissipating fin, a heat dissipating silicone layer, a semiconductor heat dissipating element, or a phase changing material.

According to some embodiments of the present disclosure, as shown in FIG. 10, the heat dissipating component 230 may be a wind wheel 231 (or a heat dissipation fan). When the battery pack 200 is inserted into the vacuum cleaner to work, flowing air can be formed in the inner chamber 240 by the wind wheel 231 and can pass through the first through-hole 211 and the second through-hole 213 so as to speed up heat dissipation of the battery 220, so that the battery 220 in the case of rapid discharging may not enter a temperature protection mode soon, which may prolong discharging time of the battery 220 and working hours of the vacuum cleaner.

According to further embodiments of the present disclosure, as shown in FIG. 11, the heat dissipating component 230 may be a heat dissipating fin 232, a first end of the heat dissipating fin 232 is connected with the battery 220, and a second end of the heat dissipating fin 232 extends toward the housing 210. It may be understood that the first end of the heat dissipating fin 232 is in direct contact with the battery 220, and the second end of the heat dissipating fin 232 extends toward the side wall of the housing 210. For example, as shown in FIG. 11, the first end of the heat dissipating fin 232 is connected with the battery 220, and the second end of the heat dissipating fin 232 extends toward the second side wall 214.

The heat dissipating fin 232 is a heat dissipating device for an electronic component easy to generate heat and may be made of aluminum alloy, brass or bronze, etc. When the battery 220 works, heat generated therefrom can be rapidly transferred to the heat dissipating fin 232 and then transferred to air close to the side wall of the housing 210 by the heat dissipating fin 232, so that the temperature of the battery 220 itself may not increase too rapidly and waiting time for cooling the battery 220 may be shortened.

According to a further embodiment of the present disclosure, as shown in FIG. 11, the second end of the heat dissipating fin 232 has a plurality of grooves 233 spaced apart from each other. It may be understood that the end of the heat dissipating fin 232 away from the battery 220 is provided with the plurality of grooves 233 spaced apart from each other. Therefore, the amount of air in the battery pack 200 can be increased, and heat of the heat dissipating fin 232 can be transmitted outwards through the air in the grooves 233, so that the heat exchanging efficiency can be improved. Further, the plurality of grooves 233 are distributed uniformly, so that the heat exchange rate between the heat dissipating fin 232 and the air can be balanced. It should be noted that, the shape of the groove 233 is not limited, and may be in a rectangular shape, a U-shape or an arc shape.

Figure 12:
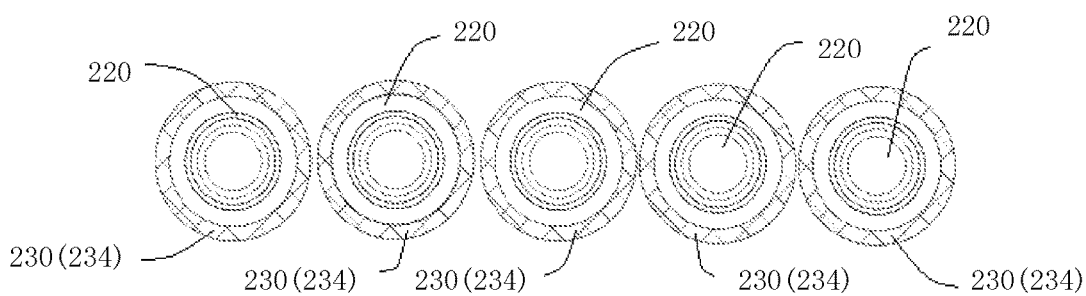
FIG. 12 is a sectional schematic view of a battery pack according to a third embodiment of the present disclosure.

According to further embodiments of the present disclosure, as shown in FIG. 12, the heat dissipating component 230 may be the heat dissipating silicone layer 234 wrapped around a periphery of the battery 220. The heat dissipating silicone is a thermal conductive material which has a low thermal resistance, high thermal conductivity, and high flexibility. The high flexibility of the material can reduce the pressure on the battery 220 and cover the uneven surface of the battery 220 so that the battery 220 can be fully in contact with the heat dissipating silicone layer 234 to improve the heat conduction efficiency and meet the heat conduction requirement of the battery pack 200 restricted by the space limit. When the temperature of the battery pack 200 rises to a certain value in working process, a large amount of heat from the battery 220 can be absorbed by and stored in the heat dissipating silicone layer 234 due to its morphologic change so as to lower the temperature of the battery 220.

According to other embodiments of the present disclosure, as shown in FIG. 13, the heat dissipating component 230 may be the semiconductor heat dissipating element 235. The semiconductor heat dissipating element 235 has a high reliability and may not cause refrigerant contamination, and thus can be applied in some cases with limited space. By using Peltier effect of semiconductor materials, when the direct current goes through a galvanic couple formed by two different semiconductor materials in series, the heat can be absorbed at a first of the galvanic couple and released at a second end of the galvanic couple. The first end of the galvanic couple which absorbs heat is disposed in the battery pack 200, so that heat from the battery 220 can be absorbed by refrigeration of the semiconductor so as to cool the battery 220. According to further embodiments of the present disclosure, the heat dissipating component 230 may be the phase changing material, and the phase changing material may be wrapped on the surface of the battery 220 for absorbing the heat generated by the battery 220.

As shown in FIGS. 10-13, according to some embodiments of the present disclosure, there are a plurality of batteries 220 spaced apart from each other. It may be understood that the plurality of batteries 220 are spaced apart between the first side wall 212 and the second side wall 214. For example, in an embodiment of the present disclosure, as shown in FIG. 10-13, between the first side wall 212 and the second side wall 214 and in a direction parallel to an extending direction of the first side wall 212, the plurality of batteries 220 are arranged sequentially and uniformly spaced apart from each other. As a result, capacity of the battery pack 200 can be increased and discharging duration of the battery pack 200 can be prolonged, and thus using duration of the vacuum cleaner can be prolonged.

Therefore, by providing the heat dissipating component in the housing of the battery pack, the heat generated by the battery can be dissipated and the temperature in the battery pack can be reduced, so that the battery can work within a proper temperature range and battery performance can be maximized so as to increase the service life of the battery, increase working time and working efficiency of the vacuum cleaner, as well as ensure reliability and safety of fast charging. Moreover, fast heat dissipation can also reduce time waiting for charging after the battery is used.

Further, in some embodiments of the present disclosure, the battery pack 200 is located in the air duct of the vacuum cleaner. As a result, a convection channel can be formed by the air in the air duct of the vacuum cleaner and the inner chamber 240 to accelerate the air flowing rate, so as to increase the heat exchange rate between the air in the inner chamber 240 and the air in the air duct and further improve the heat dissipating efficiency of the battery pack 200.

In addition, heat form the charger may be dissipated by one of the heat dissipating fin, the wind wheel and the semiconductor heat dissipating element. The heat dissipating fin is in contact with a high-power heat-generating device to absorb heat of the heat-generating device and radiate and conduct the heat; the wind-wheel may be disposed in the charger to dissipate heat of the high-power heat-generating device through convection; the semiconductor heat dissipating element may disposed near the high-power heat-generating device and configured to absorb the heat of the high-power heat-generating device so as to realize the purpose of cooling, ensuring the reliability and safety of fast charging.

In summary, with the charger for the vacuum cleaner according to embodiments of the present disclosure, not only charging requirements of different types of devices to be charged, such as the vacuum cleaner and the battery pack can be realized, helping to improve user experience, but also the fast charging of the battery pack can be ensured, shortening the charging time of the battery pack, and good safety and high reliability of the battery pack during charging process help to improve the using convenience of the vacuum cleaner, and thus improve user experience. In addition, when the battery pack is fully charged or abnormal condition happens during charging the battery pack, charging for the battery pack can be stopped by the turn-off controlling device, thus not only improving the safety of the charger, but also reducing energy consumption and saving energy. Moreover, by providing the heat dissipating component in the housing of the battery pack, the heat generated by the battery can be dissipated and the temperature in the battery pack can be reduced, so that the battery can work within a proper temperature range and battery performance can be maximized so as to increase the service life of the battery and increase working time and working efficiency of the vacuum cleaner. Furthermore, rapid heat dissipation can also reduce time waiting for charging after the battery is used.

Further, a fast charging controlling method for a charger for a vacuum cleaner is also provided in embodiments of the present disclosure.

In an embodiment of the present disclosure, referring to FIG. 1, the charger for the vacuum cleaner includes a plurality of first charging interfaces, a rectifying device, and a plurality of charging controlling devices. The plurality of first charging interface includes at least a main charging interface corresponding to the vacuum cleaner and a battery charging interface corresponding to a battery pack. An input end of the rectifying device is connected with an alternating current power supply, and the rectifying device is configured to receive an alternating current output by the alternating current power supply and rectify the alternating current to output a direct current. Each of the plurality of charging controlling devices is connected between an output end of the rectifying device and a first charging interface correspondingly.

Figure 14:
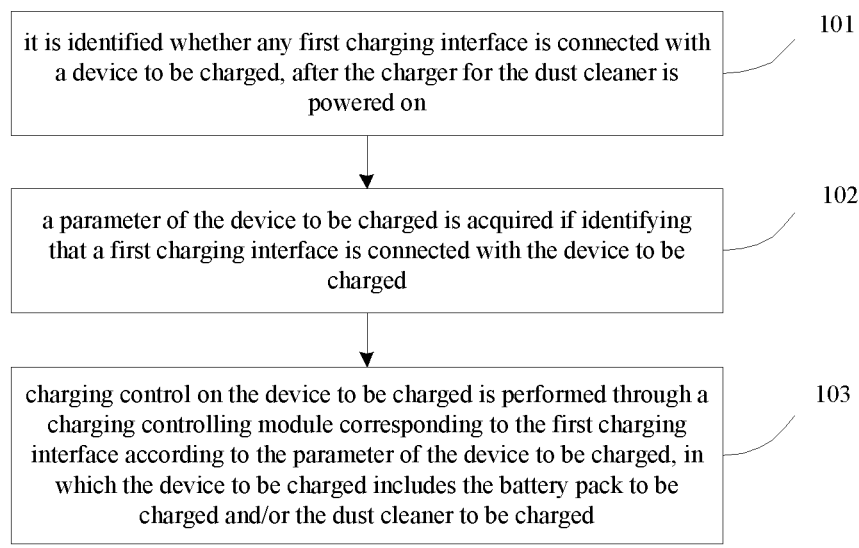
FIG. 14 is a flow chart of a fast charging controlling method for a charger for a vacuum cleaner according to an embodiment of the present disclosure.

FIG. 14 is a flow chart of a fast charging controlling method for a charger for a vacuum cleaner according to an embodiment of the present disclosure. As shown in FIG. 14, the fast charging controlling method for the charger for the vacuum cleaner includes the following blocks.

At block 101, it is identified whether any first charging interface is connected with a device to be charged, after the charger for the vacuum cleaner is powered on.

At block 102, a parameter of the device to be charged is acquired if identifying that a first charging interface is connected with the device to be charged. At block 103, charging control on the device to be charged is performed through a charging controlling device corresponding to the first charging interface according to the parameter of the device to be charged, in which the device to be charged includes the battery pack to be charged and/or the vacuum cleaner to be charged.

In an embodiment of the present disclosure, charging control is performed on only one device to be charged corresponding to the first charging interface in any charging time period.

In one embodiment, whether a parameter of the battery pack to be charged is normal is judged when identifying that only the battery pack to be charged is connected with the first charging interface, and charging control on the battery pack to be charged is performed through a charging controlling device corresponding to the first charging interface when the parameter of the battery pack to be charged is normal; whether a parameter of the battery pack in the vacuum cleaner to be charged is normal is judged by a main controlling device when identifying that only the vacuum cleaner to be charged is connected with the first charging interface, and charging control on the vacuum cleaner to be charged is performed through a charging controlling device corresponding to the first charging interface when the parameter of the battery pack in the vacuum cleaner to be charged is normal; and charging control on the vacuum cleaner to be charged is performed preferentially by a main controlling device when identifying that the battery pack to be charged and the vacuum cleaner to be charged each are connected with a first charging interface, and then charging control on the battery pack to be charged is performed after charging of the vacuum cleaner to be charged is completed.

The parameter of the device to be charged includes a temperature and a voltage of the device to be charged. In one embodiment, the parameter of the device to be charged includes a temperature and a voltage of the battery pack to be charged when the device to be charged is the battery pack to be charged; and the parameter of the device to be charged includes a temperature and a voltage of the battery pack in the vacuum cleaner to be charged when the device to be charged is the vacuum cleaner to be charged.

Further, according to an embodiment of the present disclosure, performing charging control on the device to be charged through a charging controlling device corresponding to the first charging interface according to the parameter of the device to be charged includes: acquiring the voltage of the battery pack; judging whether the voltage of the battery pack is greater than or equal to a first preset voltage; acquiring the temperature of the battery pack when the voltage of the battery pack is greater than or equal to the first preset voltage; and performing charging control on the battery pack according to the temperature of the battery pack.

Further, performing charging control on the battery pack according to the temperature of the battery pack includes: judging the temperature of the battery pack; charging the battery pack with a first charging current in a constant current mode if the temperature of the battery pack is greater than a first preset temperature and less than a second preset temperature; charging the battery pack with a second charging current in a constant current mode if the temperature of the battery pack is less than or equal to the first preset temperature and greater than or equal to a third preset temperature or if the temperature of the battery pack is greater than or equal to the second preset temperature and less than or equal to a fourth preset temperature, in which the second charging current is less than the first charging current; and not charging the battery pack if the temperature of the battery pack is less than the third preset temperature or if the temperature of the battery pack is greater than the fourth preset temperature.

According to an embodiment of the present disclosure, the battery pack is reconditioned with a pre-charging current when the voltage of the battery pack is less than the first preset voltage, and the charging of the battery pack is stopped and the vacuum cleaner is controlled to transmit an error-reporting message if the voltage of the battery pack is still less than the first preset voltage after the battery pack is reconditioned for a preset time, in which the pre-charging current is less than the first charging current.

According to an embodiment of the present disclosure, whether the battery pack is in a failed state is judged according to the voltage of the battery pack before judging whether the voltage of the battery pack is greater than or equal to the first preset voltage, and the charging of the battery pack is stopped and the vacuum cleaner is controlled to transmit the error-reporting message, if the battery pack is in the failed state.

According to an embodiment of the present disclosure, the battery pack is charged with a first charging voltage in a constant voltage mode if the voltage of the battery pack reaches the first charging voltage after the battery pack is charged with the first charging current in the constant current mode; the battery pack is charged with the second charging current in the constant current mode when the charging current of the battery pack drops to the second charging current; the battery pack is charged with a second charging voltage in a constant voltage mode if the voltage of the battery pack reaches the second charging voltage after the battery pack is charged with the second charging current in the constant current mode; completion of the charging for the battery pack is determined until the charging current of the battery pack drops to a third charging current, in which the second charging voltage is less than the first charging voltage and the third charging current is less than the second charging current.

It should be illustrated that, other implementation manners of the fast charging controlling method for a charger for a vacuum cleaner according to embodiments of the present disclosure may refer to the implementation manners of the charger for the vacuum cleaner according to the above embodiments of the present disclosure.

With the fast charging controlling method for the charger for the vacuum cleaner of the embodiments of the present disclosure, after the charger for the vacuum cleaner is powered on, it is identified whether any first charging interface is connected with a device to be charged, a parameter of the device to be charged is acquired if identifying that a first charging interface is connected with the device to be charged, and charging control on the device to be charged is performed through a charging controlling device corresponding to the first charging interface according to the parameter of the device to be charged. Thus, charging requirements of different types of devices to be charged, such as the vacuum cleaner and the battery pack can be realized, thereby improving user experience.

Further, embodiments of the present disclosure also provides a vacuum cleaner, including a DC motor, a battery pack and a charger, and the charger includes: a plurality of first charging interfaces including at least a main charging interface corresponding to the vacuum cleaner and a battery charging interface corresponding to the battery pack; a rectifying device having an input end connected with an alternating current power supply, and configured to receive an alternating current output by the alternating current power supply and rectify the alternating current to output a direct current; a plurality of charging controlling devices each connected between an output end of the rectifying device and a first charging interface correspondingly; and a main controlling device configured to communicate with each of the first charging interfaces respectively to identify whether any first charging interface is connected with the battery pack, acquire a parameter of the battery pack to be charged if identifying that a first charging interface is connected with the battery pack to be charged, and perform charging control on the battery pack to be charged through a charging controlling device corresponding to the first charging interface according to the parameter of the battery pack to be charged.

It should be illustrated that, other implementation manners of the vacuum cleaner according to embodiments of the present disclosure may refer to the implementation manners of the charger for the vacuum cleaner according to the above embodiments of the present disclosure, and will be elaborated herein.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-integrated circuit having an appropriate combination logic gate circuit, a programmable gate array (PGA), a field programmable gate array (FPGA), etc.

In addition, in the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not require that the present disclosure be constructed or operated in an orientation.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the phrase of "a plurality of" means two or more than two, for example, two or three, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," or "in some examples," in various places throughout this specification are not necessarily referring to the same embodiment or example of the present disclosure. Furthermore, the particular features, structures, materials, or characteristics may be combined in any suitable manner in one or more embodiments or examples.

What is claimed is:
1. A charger, comprising:
   a plurality of first charging interfaces comprising at least a main charging interface corresponding to a device to be charged and a battery charging interface corresponding to a battery pack;

a rectifying device having an input end connected with an alternating current power supply, and configured to receive an alternating current output by the alternating current power supply and rectify the alternating current to output a direct current;

a plurality of charging controlling devices each connected between an output end of the rectifying device and a first charging interface; and a main controlling device configured to communicate with each of the first charging interfaces to identify whether any first charging interface is connected with the device to be charged, acquire a parameter of the device if identifying that a first charging interface is connected with the device, and perform charging control on the device through a charging controlling device corresponding to the first charging interface according to the parameter of the device, wherein the device comprises the battery pack and/or a vacuum cleaner;

wherein the parameter of the device comprises a temperature and a voltage of the battery pack if the device is the battery pack; and the parameter of the device comprises a temperature and a voltage of the battery pack in the vacuum cleaner if the device is the vacuum cleaner;

wherein the main controlling device comprises:

a first acquiring device configured to acquire the voltage of the battery pack;

a judging device configured to judge whether the voltage of the battery pack is greater than or equal to a first preset voltage;

a second acquiring device configured to acquire the temperature of the battery pack when the voltage of the battery pack is greater than or equal to the first preset voltage; and a controlling sub-device configured to perform charging control on the battery pack according to the temperature of the battery pack.

2. The charger according to claim 1, wherein the main controlling device is configured to:

determine whether a parameter of the battery pack to be charged is normal when identifying that only the battery pack to be charged is connected with a first charging interface, and perform charging control on the battery pack to be charged through a charging controlling device corresponding to the first charging interface if the parameter of the battery pack to be charged is normal;

determine whether a parameter of the battery pack in the vacuum cleaner to be charged is normal when identifying that only the vacuum cleaner to be charged is connected with a first charging interface, and perform charging control on the vacuum cleaner to be charged through a charging controlling device corresponding to the first charging interface if the parameter of the battery pack in the vacuum cleaner to be charged is normal; and perform charging control on the vacuum cleaner to be charged preferentially when identifying that the battery pack to be charged and the vacuum cleaner to be charged each are connected with a first charging interface respectively, and then perform charging control on the battery pack to be charged after charging of the vacuum cleaner to be charged is completed.

3. The charger according to claim 1, further comprising:

at least one second charging interface comprising at least one of: a USB charging interface, a TYPE-C charging interface, and a 12VDC charging interface; and at least one voltage conversion device connected with the output end of the rectifying device, and configured to perform a boost conversion or a buck conversion on the direct current output by the rectifying device and apply a direct current converted to the at least one second charging interface.

4. The charger according to claim 1, wherein the controlling sub-device is configured to:

determine the temperature of the battery pack;

charge the battery pack with a first charging current in a constant current mode when the temperature of the battery pack is greater than a first preset temperature and less than a second preset temperature;

charge the battery pack with a second charging current in a constant current mode when the temperature of the battery pack is less than or equal to the first preset temperature and greater than or equal to a third preset temperature or when the temperature of the battery pack is greater than or equal to the second preset temperature and less than or equal to a fourth preset temperature, wherein the second charging current is less than the first charging current; and not charge the battery pack when the temperature of the battery pack is less than the third preset temperature or when the temperature of the battery pack is greater than the fourth preset temperature.

5. The charger according to claim 1, further comprising:

a prompting device;

wherein the controlling sub-device is further configured to recondition the battery pack with a pre-charging current when the voltage of the battery pack is less than the first preset voltage, and to stop charging the battery pack and control the prompting device to transmit an error-reporting message if the voltage of the battery pack is still less than the first preset voltage after the battery pack is reconditioned for a preset time, wherein the pre-charging current is less than the first charging current.

6. The charger according to claim 5, wherein the judging device is further configured to judge whether the battery pack is in a failed state according to the voltage of the battery pack before judging whether the voltage of the battery pack is greater than or equal to the first preset voltage, and the controlling sub-device is configured to stop charging the battery pack and control the prompting device to transmit the error-reporting message, if the battery pack is in the failed state.

7. The charger according to claim 4, wherein the controlling sub-device is further configured to:

charge the battery pack with a first charging voltage in a constant voltage mode, if the voltage of the battery pack reaches the first charging voltage after the battery pack is charged with the first charging current in the constant current mode;

charge the battery pack with the second charging current in the constant current mode when the charging current of the battery pack drops to the second charging current;

charge the battery pack with a second charging voltage in a constant voltage mode if the voltage of the battery pack reaches the second charging voltage after the battery pack is charged with the second charging current in the constant current mode;

determine completion of the charging for the battery pack until the charging current of the battery pack drops to a third charging current, wherein the second charging voltage is less than the first charging voltage and the third charging current is less than the second charging current.

8. The charger according to claim 6, further comprising:
a plurality of turn-off controlling devices each connected between an output end of a charging controlling device and a first charging interface correspondingly,
wherein a corresponding turn-off controlling device is controlled by the controlling sub-device to stop charging the battery pack.

9. The charger according to claim 8, further comprising:
a plurality of charging voltage detecting devices, each disposed between a turn-off controlling device and a first charging interface correspondingly, connected with the controlling sub-device, and configured to detect a charging voltage of the first charging interface, wherein the turn-off controlling device is controlled by the controlling sub-device to stop charging the battery pack when the charging voltage of the first charging interface is abnormal;
and,
a plurality of charging current detecting devices, each disposed between a turn-off controlling device and a first charging interface correspondingly, connected with the controlling sub-device, and configured to detect a charging current of the first charging interface, wherein the turn-off controlling device is controlled by the controlling sub-device to stop charging the battery pack when the charging current of the first charging interface is abnormal.

10. The charger according to claim 1, wherein the battery pack comprises:
a housing;
a battery located within the housing; and
a heat dissipating component configured to dissipate heat of the battery and located within the housing.

11. The charger according to claim 10, wherein two opposite side walls of the housing are a first side wall and a second side wall, the first side wall has a first through-hole, the second side wall has a second through-hole opposite to the first through-hole, both of the battery and the heat dissipating component are located between the first side wall and the second side wall.

12. The charger according to claim 10, wherein the heat dissipating component comprises at least one of a wind wheel, a heat dissipating fin, a heat dissipating silicone layer, a semiconductor heat dissipating element, or a phase changing material,
wherein when the heat dissipating component is the heat dissipating fin, a first end of the heat dissipating fin is connected with the battery, and a second end of the heat dissipating fin extends toward the housing and has a plurality of grooves spaced apart from each other; and
when the heat dissipating component is the heat dissipating silicone layer, the heat dissipating silicone layer is wrapped at a periphery of the battery.

13. The charger according to claim 10, wherein the battery pack is located within an air duct of the device to be charged.

14. A fast charging controlling method for a charger for a vacuum cleaner, wherein the charger comprises a plurality of first charging interfaces, a rectifying device, a plurality of charging controlling devices, and a main controlling device, wherein the plurality of first charging interface comprises at least a main charging interface corresponding to the vacuum cleaner and a battery charging interface corresponding to a battery pack, an input end of the rectifying device is connected with an alternating current power supply, the rectifying device is configured to receive an alternating current output by the alternating current power supply and rectify the alternating current to output a direct current, each of the plurality of charging controlling devices is connected between an output end of the rectifying device and a first charging interface correspondingly, and the main controlling device is configured to communicate with each of the first charging interfaces respectively, the method comprising:
identifying whether any first charging interface is connected with a device to be charged, after the charger is powered on;
acquiring a parameter of the device if identifying that a first charging interface is connected with the device; and
performing charging control on the device through a charging controlling device corresponding to the first charging interface according to the parameter of the device, wherein the device comprises the battery pack and/or the vacuum cleaner;
wherein the parameter of the device comprises a temperature and a voltage of the battery pack when the device is the battery pack; and
the parameter of the device comprises a temperature and a voltage of the battery pack in the vacuum cleaner when the device is the vacuum cleaner;
wherein performing charging control on the device through a charging controlling device corresponding to the first charging interface according to the parameter of the device comprises:
acquiring the voltage of the battery pack;
judging whether the voltage of the battery pack is greater than or equal to a first preset voltage;
acquiring the temperature of the battery pack when the voltage of the battery pack is greater than or equal to the first preset voltage; and
performing charging control on the battery pack according to the temperature of the battery pack.

15. The fast charging controlling method according to claim 14, wherein performing charging control on the device to be charged through a charging controlling device corresponding to the first charging interface according to the parameter of the device to be charged comprises:
judging whether a parameter of the battery pack to be charged is normal when identifying that only the battery pack to be charged is connected with a first charging interface, and performing charging control on the battery pack to be charged through a charging controlling device corresponding to the first charging interface when the parameter of the battery pack to be charged is normal;
judging by the main controlling device whether a parameter of the battery pack in the vacuum cleaner to be charged is normal when identifying that only the vacuum cleaner to be charged is connected with a first charging interface, and performing charging control on the vacuum cleaner to be charged through a charging controlling device corresponding to the first charging interface when the parameter of the battery pack in the vacuum cleaner to be charged is normal; and
performing charging control on the vacuum cleaner to be charged by the main controlling device preferentially when identifying that the battery pack to be charged and the vacuum cleaner to be charged each are connected with a first charging interface, and then performing charging control on the battery pack to be charged through the main controlling device after charging of the vacuum cleaner to be charged is completed.

16. The fast charging controlling method according to claim 14, wherein performing charging control on the battery pack according to the temperature of the battery pack comprises:

judging the temperature of the battery pack;

charging the battery pack with a first charging current in a constant current mode if the temperature of the battery pack is greater than a first preset temperature and less than a second preset temperature;

charging the battery pack with a second charging current in a constant current mode if the temperature of the battery pack is less than or equal to the first preset temperature and greater than or equal to a third preset temperature or if the temperature of the battery pack is greater than or equal to the second preset temperature and less than or equal to a fourth preset temperature, wherein the second charging current is less than the first charging current; and not charging the battery pack if the temperature of the battery pack is less than the third preset temperature or if the temperature of the battery pack is greater than the fourth preset temperature.

17. The fast charging controlling method according to claim 14, wherein the battery pack is reconditioned with a pre-charging current when the voltage of the battery pack is less than the first preset voltage, and the charging of the battery pack is stopped and the vacuum cleaner is controlled to transmit an error-reporting message if the voltage of the battery pack is still less than the first preset voltage after the battery pack is reconditioned for a preset time, wherein the pre-charging current is less than the first charging current.

18. The fast charging controlling method according to claim 17, wherein whether the battery pack is in a failed state is judged according to the voltage of the battery pack before judging whether the voltage of the battery pack is greater than or equal to the first preset voltage, and the charging of the battery pack is stopped and the vacuum cleaner is controlled to transmit the error-reporting message, if the battery pack is in the failed state.

19. The fast charging controlling method according to claim 14, wherein the battery pack is charged with a first charging voltage in a constant voltage mode if the voltage of the battery pack reaches the first charging voltage after the battery pack is charged with the first charging current in the constant current mode; the battery pack is charged with the second charging current in the constant current mode when the charging current of the battery pack drops to the second charging current; the battery pack is charged with a second charging voltage in a constant voltage mode if the voltage of the battery pack reaches the second charging voltage after the battery pack is charged with the second charging current in the constant current mode; completion of the charging for the battery pack is determined until the charging current of the battery pack drops to a third charging current, wherein the second charging voltage is less than the first charging voltage and the third charging current is less than the second charging current.

20. A vacuum cleaner, comprising:

a DC motor, a battery pack and a charger, wherein the charger comprises:

a plurality of first charging interfaces comprising at least a main charging interface corresponding to the vacuum cleaner and a battery charging interface corresponding to the battery pack;

a rectifying device having an input end connected with an alternating current power supply, and configured to receive an alternating current output by the alternating current power supply and rectify the alternating current to output a direct current;

a plurality of charging controlling devices each connected between an output end of the rectifying device and a first charging interface correspondingly; and a main controlling device configured to communicate with each of the first charging interfaces respectively to identify whether any first charging interface is connected with the battery pack, acquire a parameter of the battery pack if identifying that a first charging interface is connected with the battery pack, and perform charging control on the battery pack through a charging controlling device corresponding to the first charging interface according to the parameter of the battery pack;

wherein the parameter of the battery pack comprises a temperature and a voltage of the battery pack;

wherein the main controlling device comprises:

a first acquiring device configured to acquire the voltage of the battery pack;

a judging device configured to judge whether the voltage of the battery pack is greater than or equal to a first preset voltage;

a second acquiring device configured to acquire the temperature of the battery pack when the voltage of the battery pack is greater than or equal to the first preset voltage; and a controlling sub-device configured to perform charging control on the battery pack according to the temperature of the battery pack.

* * * * *